United States Patent [19]

Bien

[11] Patent Number: 4,504,164
[45] Date of Patent: Mar. 12, 1985

[54] TELESCOPIC SHAFT COUPLING ARRANGEMENT

[75] Inventor: Alfred A. Bien, West Bloomfield, Mich.

[73] Assignee: Chrysler Corporation, Highland Park, Mich.

[21] Appl. No.: 637,989

[22] Filed: Aug. 6, 1984

[51] Int. Cl.³ .............................................. F16B 7/10
[52] U.S. Cl. .................................. 403/109; 403/379; 403/330; 74/492; 74/493
[58] Field of Search ............... 403/378, 379, 330, 108, 403/109; 74/492, 493

[56] References Cited

U.S. PATENT DOCUMENTS

| | | | |
|---|---|---|---|
| 2,363,520 | 11/1944 | Fish | 403/379 X |
| 2,409,662 | 10/1946 | Christensen | 403/379 X |
| 4,406,641 | 9/1983 | Mallet | 74/492 X |

FOREIGN PATENT DOCUMENTS 990912  5/1965  United Kingdom ............... 403/108

Primary Examiner—Andrew V. Kundrat
Attorney, Agent, or Firm—Edward P. Barthel

[57] ABSTRACT

A coupling for inner and outer telescoping shafts comprises a one-piece sheetmetal clip having a sleeve portion slidably received on the outer shaft. A resilient leg portion extends longitudinally from the sleeve portion and is provided at its free end with an inwardly projecting locking hub and an outwardly projecting internally threaded collar. In its collapsed retained mode the locking hub extends through an aperture in the outer tubular shaft and flexes the leg portion biasing the inner shaft into frictional retained engagement with the outer shaft. Upon the shafts being axially moved to an extended locked mode the hub is snapped into an inner shaft blind bore. This aligns an inner shaft through bore with opposed holes in the outer shaft and the collar for threaded reception of a through bolt.

5 Claims, 6 Drawing Figures

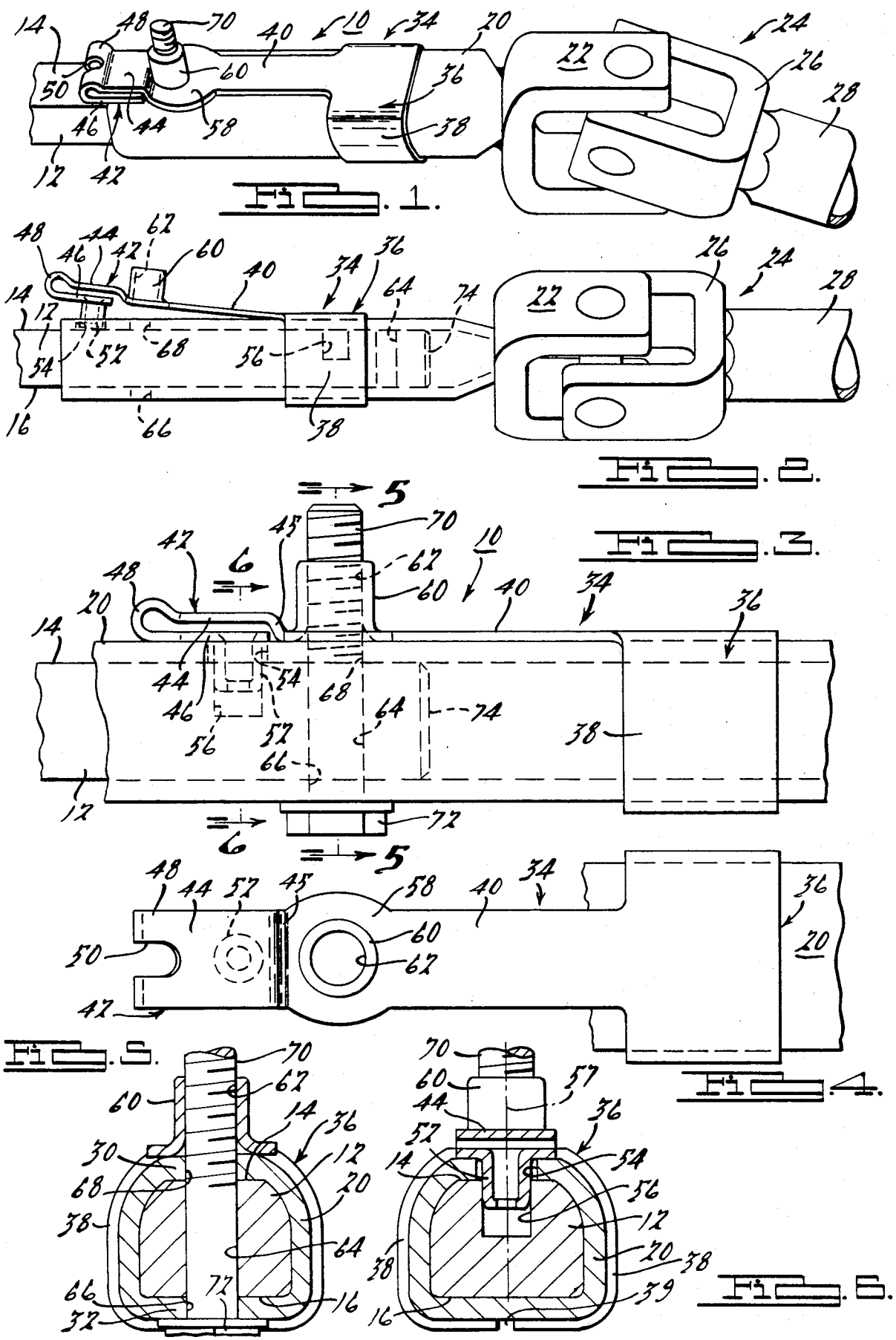

TELESCOPIC SHAFT COUPLING ARRANGEMENT

BACKGROUND OF THE INVENTION

The present invention relates to a coupling between vehicle steering column shafts, and more particularly to improvements in a snap-action one piece clip providing a dual locking connection.

The prior art discloses various forms of couplings for telescoping steering columns. An example of one such coupling is found in U.S. Pat. No. 4,406,641 to Mallet issued Sept. 27, 1983, for a Torque Transmitting Coupling. The Mallet coupling is designed for a splined sleeve and shaft connection requiring costly machining operations to support an elastic compression spring.

SUMMARY OF THE PRESENT INVENTION

The object of the present invention is to provide a telescopic steering shaft coupling for a vehicle wherein a one-piece locking clip and threaded bolt combine in a fail-safe dual locking arrangement. The clip has a sleeve portion for non-rotational spring retention on an outer tubular member. A resilient leg extends longitudinally from the sleeve portion and includes a transverse locking hub for snap-in engagement with a first bore in a telescoping inner rod. The clip leg includes an internally threaded upstanding collar adapted to receive a threaded bolt. The bolt extends diametrically though a second rod bore and aligned openings in the outer tubular member. Thus, a readily assembled dual locking coupling is achieved which prevents separation of the members in the event the threaded bolt is removed. A feature of the coupling provides an initial collapsed retained mode during assembly of the vehicle steering shafts which allows ready extension of the telescoped members to the predetermined dual locked mode.

The other features and characteristics of the present invention will become apparent from the further diclosure of the invention to be made hereinafter with reference to the accompanying drawings.

BRIEF DESCRIPTION OF THE DRAWINGS

FIG. 1 is a perspective view of the invention shown in assembled relation with a steering column;

FIG. 2 is a longitudinal side elevational view of the coupling of FIG. 1 in its collapsed mode;

FIG. 3 is an enlarged fragmentary side elevational view showing the coupling of FIG. 1;

FIG. 4 is an enlarged detail view of the coupling of FIG. 3 with parts broken away;

FIG. 5 is a vertical sectional view taken on line 5—5 of FIG. 3; and

FIG. 6 is a vertical sectional view taken on line 6—6 of FIG. 3.

DESCRIPTION OF THE PREFERRED EMBODIMENT

Referring to FIG. 1, a portion of a steering column 10 is shown for use in the steering mechanism of a motor vehicle. The column includes an elongated inner solid shaft or rod member 12. The rod 12 has a portion (not shown) on its lefthand end to which other parts of the steering mechanism are attached. Such parts, however, are not essential to the instant invention. As best seen in FIGS. 5 and 6 the non-circular rod 12 is generally D-shaped in cross-section with upper 14 and lower 16 diametrically opposed parallel planar surfaces extending longitudinally thereon.

A steel tubular outer shaft member 20 is joined at one end to a yoke 22 of universal joint 24 having its other yoke 26 suitably joined to an upper steering shaft 28. As seen in FIGS. 5 and 6 the tubular member 20 has a generally D-shaped cross-section which conforms to the rod 12. Thus, the rod 12 is adapted for telescopic reception into the tubular member 20 only if they are co-axially aligned in a single rotational orientation with the tubular member planar sides 30 and 32 in opposed relation with their respective rod surfaces 14 and 16.

The present invention concerns a one-piece spring clip and bolt arrangement to positively couple the solid rod 12 telescopically within the outer tubular member 20 in a ready fail-safe manner. FIGS. 1 and 2 show the one-piece sheetmetal clip, generally indicated at 34, having a sleeve portion 36 formed with a generally D-shaped cross-section conforming to the outer tubular member 20. The sleeve portion 36 is defined by a pair of lateral arms 38 having their free ends in opposed spaced relation defining a longitudinal gap 39. The arms are biased inward for spring loaded sliding retention on the tubular member 20. The sleeve portion 36 thus may be resiliently retained on the tubular member 20 at any desired location.

The sleeve portion 34 has a resilient leg 40 extending longitudinally therefrom toward the open end of the tubular member 20. The leg 40 has its free end portion 42 formed with a radially outwardly offset stepped web 44. The web 44, joined by riser 45, is supported in a plane substantially parallel with the plane of leg 40. The free end portion 42 is reversely bent upon itself forming a tongue 46 which underlies the web 44. The free end portion 42 includes a looped radius portion 48 formed with a coextensive slot 50 providing a determined spring constant for the tongue 46.

The underside or inner face of the tongue 46 has a locking hub 52 struck therefrom and projecting radially inwardly. The hub 52 is cylindrical in cross-section and has a predetermined diameter for ready insertion in a circular opening or aperture 54 in the outer tubular member 20. A blind bore 56, formed in the solid rod 12, has its principal axis aligned in the longitudinal plane of symmetry of the coupling indicated by dashed line 57 in FIG. 6. Thus, upon the rod 12 being moved axially in the tubular member 20 to a predetermined location the bore 56 and opening 54 are aligned to receive the locking hub 52 in a snap-action manner. As seen in FIG. 1 the leg 40 has an enlarged outwardly radiused area 58 adjacent the riser 45. The area 58 supports an outwardly extending cylindrical collar 60 aligned on the longitudinal plane of symmetry 57 of the coupling. The collar 60 has an internally threaded bore 62 adapted for coaxial alignment with a through bore 64 in the rod 12 and a pair of opposed holes 66 and 68 in the tubular member 20.

As best seen in FIG. 3 the rod 12 is shown telescoped into its dual locked coupled position within the tubular member 20. In this location the rod blind bore 56 is aligned with aperture 54 on the tubular member and the locking hub 52 is held therein. With the locking hub engaged in bore 56 the collar bore 62 is axially aligned with the pair of tubular member holes 66 and 68 and the rod through bore 64. In the coupled extended locked mode a suitable threaded bolt 70 is received in the through bore 64 and holes 66 and 68 for threaded reception in collar bore 62. The bolt head 72 is torqued-down with a clamping force applied to the rod and tubular member providing a rattle free positive dual locked connection.

In operation the clip sleeve portion 36 is initially slid over the tubular member 20 with the locking hub extending through aperture 54. The rod 12 is then inserted in the open end of tubular member 20 until rod free end 74 contacts the hub 52. The leg 40 is then flexed outwardly by means of a suitable tool allowing the rod free end 74 to telescope into tubular member 20 to the collapsed position shown in FIG. 2. The hub is thus resiliently biased into contact with the rod surface 14 by maintaining the leg in its outwardly flexed position. In the preferred form a small indentation (not shown) may be formed in the rod surface 14 to releasably hold the locking hub in the collasped retained mode position shown in FIG. 2.

Upon the rod being telescoped outwardly from the tubular member to the predetermined extended locked position of FIG. 3, the outwardly flexed leg 40 will snap the locking hub 52 into aligned blind bore 56 and initially lock the rod member 12 and tubular member 20. The coupling is readily completed by inserting the bolt 20 in its aligned holes 66,68; bore 64 and threaded bore 62 wherein the head is torqued down by a suitable tool.

It will be appreciated that applicant's unique coupling provides a fail-safe installation. Thus, if the bolt 70 is removed the locking hub 52 will continue to retain the rod 12 positively locked within the tubular member 20. The locking hub 52 may be removed, if desired, by simply flexing the leg 40 outwardly until the hub 52 clears the blind bore 56 thereby enabling the rod to be separated from the tubular member.

Although the present invention has been shown and described with reference to a preferred embodiment thereof, and in terms of the illustrative drawing, it should not be considered as limited thereby various possible modifications, omissions, and alternatives could be conceived by one skilled in the art without departing from the scope of the present invention. Therefore, the scope of the invention should be defined solely by the scope of the appended claims which follow:

What is claimed is:

1. A vehicle steering shaft coupling for telescopically locking an inner solid shaft member into an open end of an outer tubular shaft member, first and second axially spaced transverse bores in said inner member, said bores oriented with their principal axis parallel and aligned in a longitudinal plane of symmetry of said telescoped members, a pair of opposed holes in said outer member adapted for a coaxial alignment with said first bore, and at least one aperture in said outer member adapted for coaxial alignment with said second bore, said coupling comprising:

a one-piece metal clip including a sleeve portion and a resilient leg portion, said sleeve portion adapted for axial movement on said outer member, said leg portion extending from said sleeve portion toward said outer member open end and having an inwardly extending locking hub adjacent its free end, such that said hub is adapted to extend through said one aperture for locking reception in said second bore, said leg portion having an upstanding collar formed with a passage adapted for coaxial alignment with said first bore and said pair of opposed holes, whereby said members being initially telescopically coupled by said hub being received through said one aperture and into said second bore to thereby initially couple said members, and said initial coupling locating said collar passage in alignment with said outer member pair of opposed holes and said first bore enabling fastener means to be subsequently received in said collar passage, said pair of opposed holes, and said first bore providing a dual locked coupling for said members.

2. The coupling as set forth in claim 1 wherein said outer and inner members having complementary non-circular cross-sections preventing relative rotation between the members, and said sleeve portion having a non-circular cross-section substantially conforming with said outer member cross-section such that said sleeve portion is adapted for axial non-rotational movement on said outer member.

3. The coupling as set forth in claim 1 wherein each said shaft member having a substantially D-shaped cross section with opposed longitudinally extending planar surfaces such that said leg portion is aligned on one of said planar surfaces.

4. The coupling as set forth in claim 1 wherein said leg portion free end being reverse bent upon itself forming an underlying tongue, said tongue being oriented in a plane substantially coplanar with the plane of said leg portion.

5. A vehicle steering shaft coupling for telescopically locking an inner solid shaft member into an open end of an outer tubular shaft member, first and second axially spaced transverse bores in said inner member, said bores oriented with their principal axis parallel and aligned in a longitudinal plane of symmetry of said telecoped members, a pair of opposed holes in said outer member adapted for a coaxial alignment with said first bore, and at least one aperture in said outer member adapted for coaxial alignment with said second bore upon said members being telescopically moved to an extended locked mode from a collapsed retained mode, said coupling comprising:

a one-piece metal clip including a sleeve portion and a resilient leg portion, said leg portion extending from said sleeve portion toward said outer member open end and having an inwardly extending locking hub adjacent its free end, such that said hub is adapted for snap-in locking reception in said second bore upon said members being moved to their extended locked mode, said leg portion having an upstanding collar with an internally threaded passage adapted for coaxial alignment with said first bore and said pair of opposed holes with said members in their extended locked mode;

said members being intially coupled in said collapsed retained mode wherein said inner member free end is telescoped into said outer member with said hub being received in said outer member aperture and resiliently biased into slidable retaining contact with said inner member by virtue of said leg portion being outwardly flexed;

whereby upon said members in their collapsed retained mode being telescopically extended said hub snapping into said second bore to thereby initially couple said members in their extended locked mode, said said initial extended coupling locating said collar passage in alignment with said outer member pair of opposed holes enabling a through bolt to be subsequently threadably received in said collar passage, said pair of holes, and said first bore and torqued-down providing a dual locked coupling for said extended members.

* * * * *